United States Patent [19]
Gladish

[11] 3,873,163
[45] Mar. 25, 1975

[54] AIR CONVEYOR
[75] Inventor: Herbert E. Gladish, Ottawa, Ontario, Canada
[73] Assignee: The E. B. Eddy Company, Ontario, Canada
[22] Filed: Apr. 9, 1973
[21] Appl. No.: 349,332

[30] Foreign Application Priority Data
Apr. 20, 1972  Canada .................................. 140133

[52] U.S. Cl. ................................ 302/2 R, 302/31
[51] Int. Cl. ............................................. B65g 51/00
[58] Field of Search ...... 198/29, 158, 211; 302/2 R, 302/29, 31

[56] References Cited
UNITED STATES PATENTS

| 898,775 | 9/1908 | Norton | 302/31 X |
|---|---|---|---|
| 1,457,339 | 6/1923 | Bassler | 302/31 X |
| 2,778,691 | 1/1957 | Hazel | 302/2 R |
| 3,103,388 | 9/1963 | Cole | 302/31 |
| 3,180,688 | 4/1965 | Futer | 302/29 |
| 3,210,124 | 10/1965 | Niemi et al. | 302/29 X |
| 3,350,140 | 10/1967 | Strydom | 302/31 |
| 3,385,490 | 5/1968 | Malmgren et al. | 302/29 X |
| 3,535,003 | 10/1970 | Rudszinat | 302/2 R |
| 3,568,399 | 3/1971 | Bornfleth et al. | 302/2 R X |
| 3,610,696 | 10/1971 | Fulton | 302/29 X |

FOREIGN PATENTS OR APPLICATIONS

| 1,286,161 | 1/1962 | France | 302/2 R |
|---|---|---|---|

Primary Examiner—Evon C. Blunk
Assistant Examiner—W. Scott Carson

[57]  ABSTRACT

A conveyor for transporting objects having a curved outer surface, has curved support means, a plenum means adjacent the support for providing fluid under pressure and a plurality of spaced fluid directing nozzles communicating between the plenum means and an inner surface portion of the support. Fluid directed at an angle by the nozzles to the inner surface forms a pumping action to induce secondary ambient fluid to form a film support for the object and provides longitudinal stabilized movement thereof along the support means, and rotation if required.

18 Claims, 16 Drawing Figures

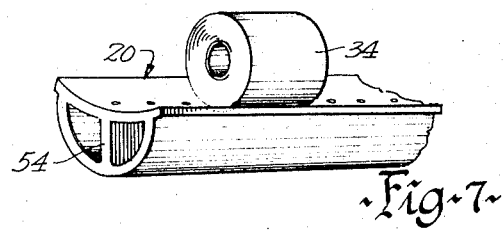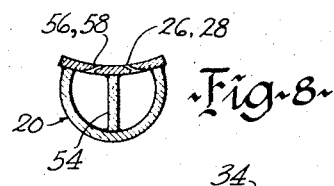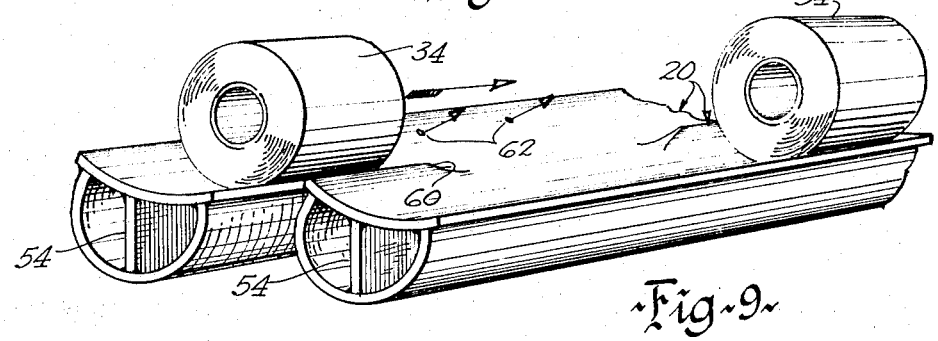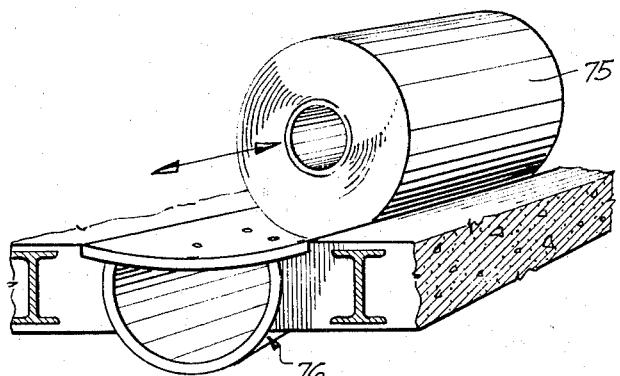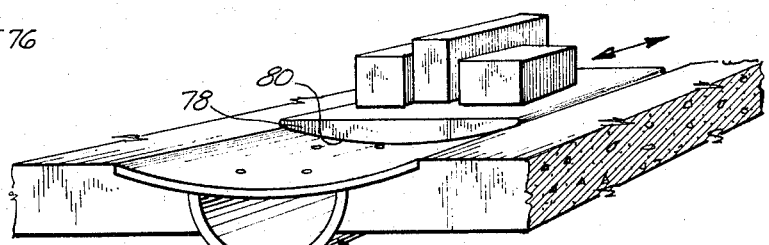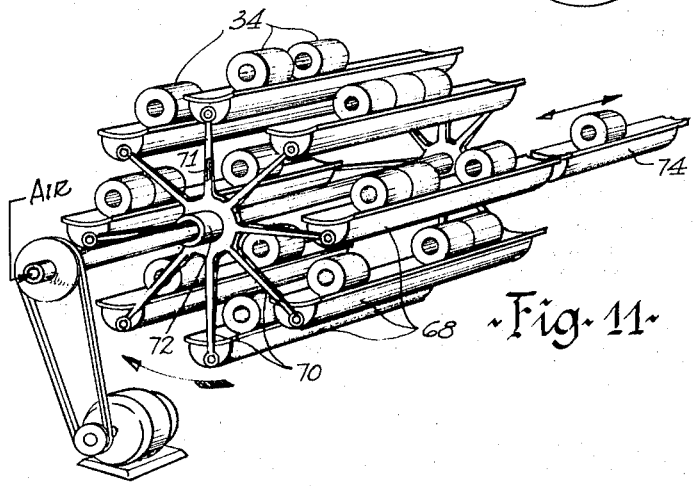

AIR CONVEYOR

The present invention relates to conveyors in general and more particularly to conveyors for transporting articles having a curved outer surface.

In the paper industry it is common practice to wind a web of finished paper onto a support cylinder to produce a roll of paper. One of the most common rolls of paper known is the roll of toilet tissue which often is manufactured in a variety of colours. As the tissue rolls are manufactured it becomes necessary to transport these rolls to wrapping areas, storage areas and shipping areas. The present practice involves conveying the rolls between guides on flat belts, a practice which is satisfactory to a certain extent for wrapped rolls, especially if there are a plurality of rolls in the package and at least two are tandemly positioned. Problems do arise with unwrapped rolls, one such problem being that the tail or loose end may become unwound from the roll. Additionally, the roll makes contact with the belt and the friction resulting, especially when the roll is stalled can disturb or soil the roll. In order to go around a corner, special belts are employed or the rolls leave the belt and pass to a rotating disc which then passes the roll to another belt going in the desired direction. In any case, stationary plates are used to facilitate transfer of the rolls and bar guides are provided on the belts and discs to retain the rolls in the desired orientation. In some instances corners are traversed by having workers push the rolls therethrough by hand, a time consuming and inefficient process. It is also noted that contact with the belts, discs, plates and guides increases the chances that the roll will be damaged due to rubbing or by projections engaging the soft, pliant surface thereof. The conveyor mechanism now in use also adds to the overall maintenance level in the mill, and is least flexible in adapting to the multiplicity of products required in a very competitive segment of the industry.

The present invention overcomes the abovementioned drawbacks by providing an air conveyor which is relatively simple, quiet, inexpensive, efficient and versatile in its applications. The same conveyor can be utilized to retain the loose ends or tails of the rolls as well as to adapt to many modes such as storage, sorting, loading and transfer as well as simple conveying. The air conveyor of the present invention comprises a concave support means adapted to receive the outer curved underside surface of the object to be conveyed. Plenum means are provided adjacent the support and a plurality of spaced nozzles communcate between the plenum means and an inner surface of the support means. These nozzles are disposed angularly with respect to the longitudinal axis of the support means and with respect to the tangent at the inner surface so as to impart longitudinal and a spiral motion to the conveyed object, if required.

Such an air conveyor permits rapid, efficient, stable movement of any type of paper roll, especially tissue rolls. The same conveyor can be used for corners; the material thereof can be flexible, and non-metallic; the roll always rides on a wedge cushion of air and hence will remain clean; and a spiral motion is imparted to the roll whereby the tail thereof always remains adjacent the overall roll body.

The invention will now be described in greater detail and with reference to the drawings wherein:

FIG. 7 is a perspective of a reversible air conveyor utilizing the principles of the present invention.

FIG. 8 is an end-view of the conveyor of FIG. 7.

FIG. 9 is a perspective view of a transfer mechanism for side-by-side air conveyors.

Figure 1:
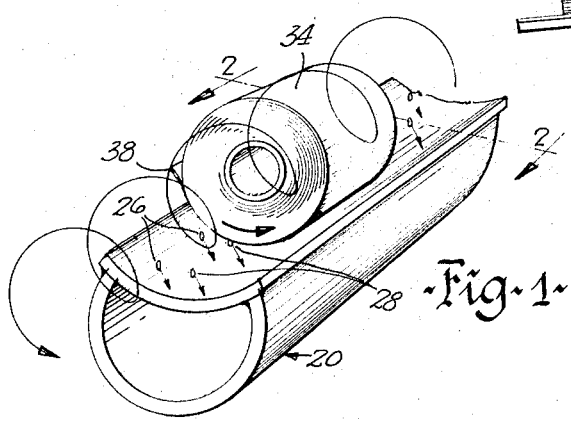
FIG. 1 is a perspective view illustrating the present invention in operation.
Figure 10:
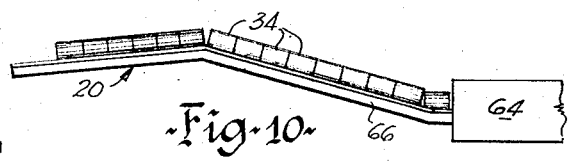

FIG. 10, appearing on the same sheet as FIG. 1, is a perspective view of an embodiment utilizing an air conveyor according to the present invention for pressure loading tissue rolls.

FIG. 11 is a perspective view of a storage and sorting system utilizing an air conveyor according to the present invention.

FIG. 12 is a perspective view of a floor conveyor for large rolls utilizing the present invention.

FIG. 13 is a perspective view of another embodiment of a floor conveyor for pallets and utilizing the present invention.

Figure 14:
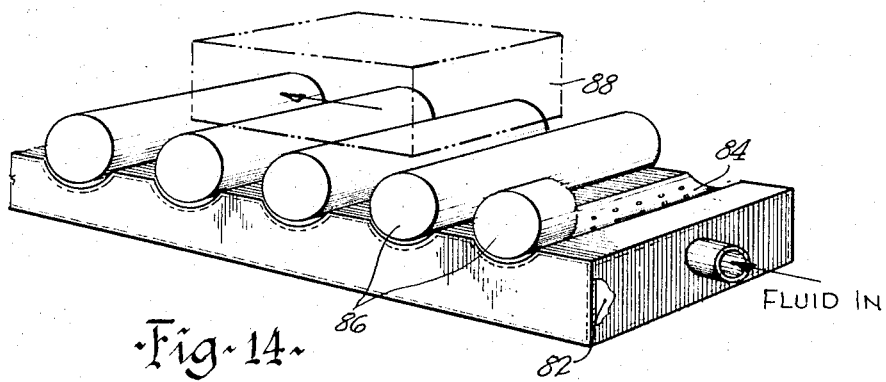

FIG. 14 is a perspective of a conveyor using a plurality of rollers and the present invention.

Figure 15:
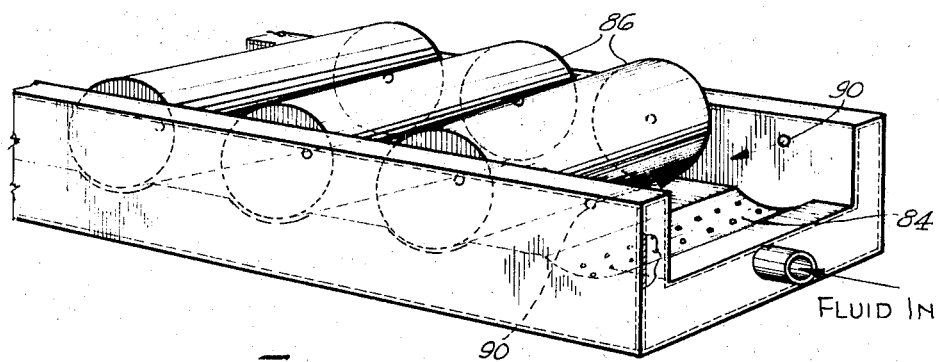

FIG. 15 is another perspective view of the conveyor of FIG. 14.

Figure 16:
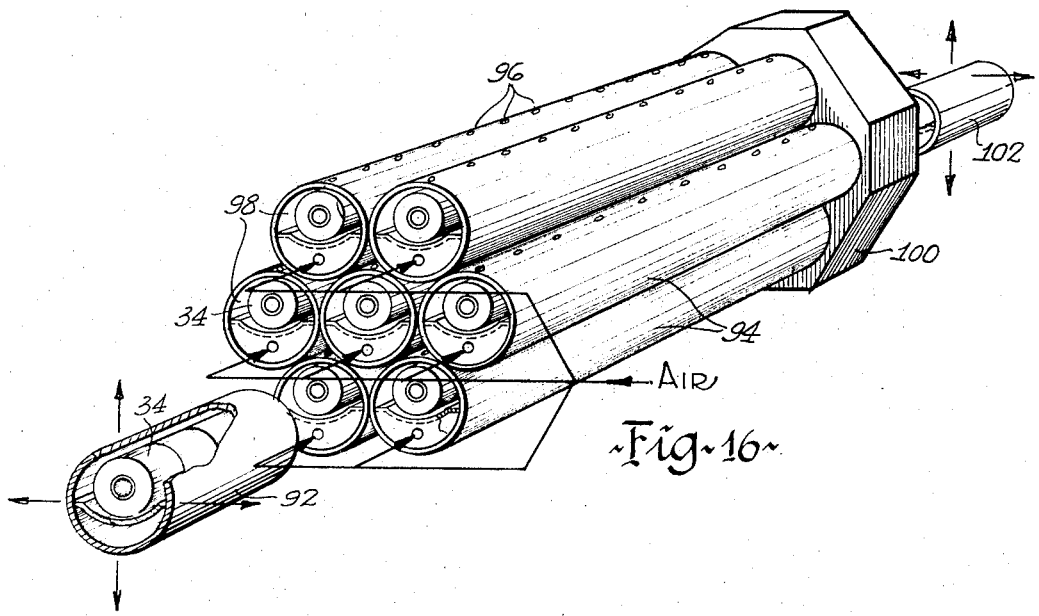

FIG. 16 is a perspective view of a further embodiment of an accumulation system.

Figure 3:
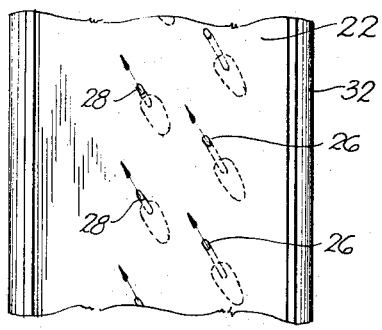
FIG. 3 is a plan view of a portion of the air conveyor of the present invention.
Figure 2:
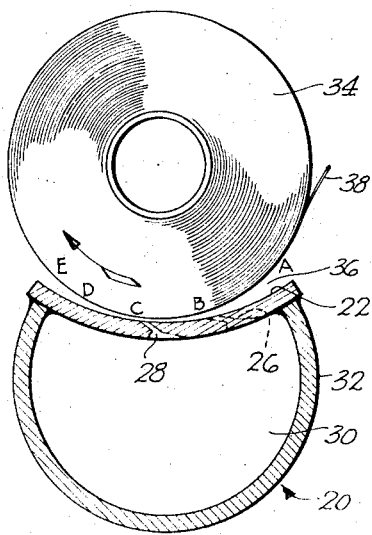
FIG. 2 is a cross-section taken along line 2—2 of FIG. 1 and showing details of the construction of the air conveyor of the present invention.

FIGS. 1 and 2 illustrate the sailstrip air conveyor in its basic configuration for use as a conveyor of paper rolls of tissue, towelling, and the like. As shown in FIG. 2 in cross-section, a preferred embodiment of the sailstrip air conveyor 20 is constructed with an upturned concave surface 22 which may be the inner surface of, for example, a flexible polyethylene pipe or trough 24, the radius of curvature being slightly greater than that of the article to be conveyed. When looking in the direction of travel, a plurality of nozzles 26 and 28 are positioned at approximately the 5 and 6 o'clock positions respectively, with nozzles 26 being staggered longitudinally with respect to nozzles 28 as shown in FIG. 3, the 6 o'clock position coinciding approximately with the centerline or line of maximum depression of the inner surface. Nozzles 26 and 28 are inclined in two directions, namely with respect to the tangent at the periphery of trough 24 and with respect to the longitudinal axis of the trough.

An air plenum 30 is formed below trough 24 by attaching thereto, as by welding for example, a second pipe section 32, having a radius which could differ with that of trough 24. Section 32 is also of a flexible nature, but it also has sufficient size to provide the necessary stiffening to the trough as well as to provide minimum loss in air pressure.

In a typical application for the conveying of tissue rolls, trough 24 might have a radius of approximately 3 inches whereas pipe section 32 might have a radius of approximately 2 inches and might constitute 240° of arc. Typically, nozzles 26 and 28 have a diameter of 3/32 inch and are in the range of 25° to 60° to the tangent at the periphery and in the range of 25° to 60° to the longitudinal axis of the trough in the direction of travel. Thus, the angle to the longitudinal axis of the trough could be decreased or increased for more propulsion or more rotation, as required. The two lines of nozzles could be 1 inch apart and spaced at 1½ inches in a staggered pattern. With such a configuration, an air pressure in the 30 to 50 inches of water range is sufficient to impart a spiral forward motion to a tissue roll 34 in the trough.

Referring again to FIG. 2, it is seen that atmospheric air A is induced into opening 36 by jets 26 at B. The induced atmospheric air is then compressed and "wedge sealed" by jet 26 at B between the trough and the roll which is displaced axially, forming a rotating impulse and is then accelerated to the jets 28 at C. Jet 28 at C is the support air reinforcing jet which provides an impulse to further accelerate the primary and secondary air. Both jets at B and C provide a component impulse in the direction of travel. At area D the film of air is constricted to thereby guide the roll. In addition the support air from the jet at C is "wedge sealed". The primary and secondary air then exhaust at E. The mechanism herein described thus provides a skirtless air support and a self-contained air pump whereby a small volume of high pressure air from plenum 30 "pumps" a larger volume of lower pressure air (atmospheric), into a film wedge.

With the air conveyor operating as indicated, a spiral swirl of air is created over the concave surface 22 to create a floating wedge or air between the convex transported surface and the concave surface 22 to thereby keep the roll out of contact with surface 22 in a stabilized manner and hence avoid roll disturbance. In the instance of transporting paper rolls the spiral motion keeps the free tail 38 tucked in against the roll. To direct floated bodies around left or right hand turns, the jets and resulting air wedge sustain the body to the one-side of the supporting surface for guiding therearound. In addition, the longitudinal component of the air jet stream is utilized to elevate paper rolls at an approximate five degree slope.

Having described the basic sailstrip principle and application, a number of further applications within the production environment will be described. The applications described are only examples of the many and varied ways in which the present invention may be utilized and they are not intended to limit the scope of the appended claims.

Figure 6:
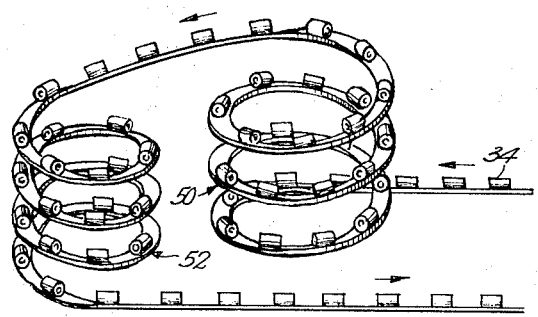
FIGS. 5 and 6 are further embodiments of accumulation systems.
Figure 5:
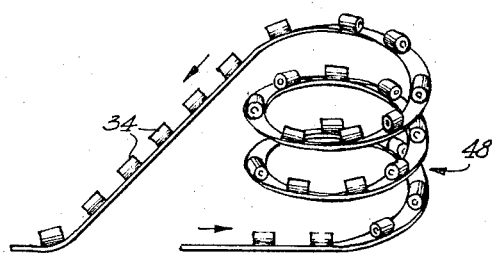
Figure 4:
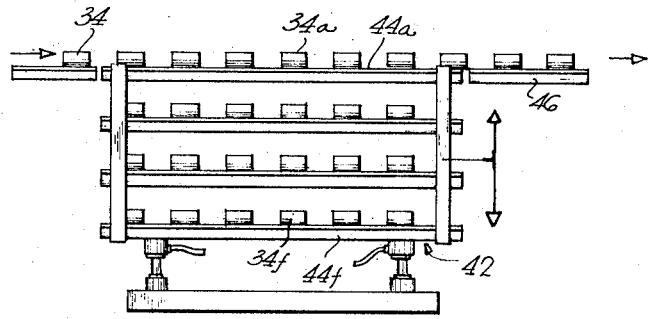
FIG. 4 is an elevation of an accumulation system using the air conveyor of the present invention.

FIGS. 4, 5 and 6 illustrate three forms of space-saving systems for accumulating stocks of paper rolls. In FIG. 4, the tissue rolls 34 are transported along air conveyor 40 from the winder, the rolls being of various colours. A moveable stack 42 of air conveyors 44 is provided to receive the rolls 34 from conveyor 40, each conveyor 44 being intended to receive rolls of a specific colour. For example, conveyor 44a may receive blue rolls 34a whereas conveyor 44f may receive pink rolls 34f. As the appropriately coloured rolls approach stack 42, the stack is raised or lowered until the requisite conveyor 44 is opposite conveyor 40 for reception of the rolls 34. A discharge conveyor 46 is provided for removal of the rolls 34 from the stack 42, the discharge operating in the same manner as the accumulation.

FIGS. 5 and 6 show two embodiments of a circular accumulation system. In FIG. 5 the rolls 34 enter a coiled stack 48 wherein they are subjected to an upwards or downwards spiral conveyor path. In this manner, many rolls may be stored in an area whereby the floor space required is very small and the storage is a continuous in-and-out system. The simplest embodiment of the coil storage system is, of course, the single loop.

FIG. 6 shows a combination of an elevating spiral 50 with a down flow spiral 52. Higher air pressures are utilized in the elevating section than in the down flow section.

A section of air conveyor 20 which permits reversing of the conveyed direction is illustrated in FIGS. 7 and 8. In this embodiment a mid wall 54 divides the plenum chamber in half and two sets of nozzles are provided. One set 26, 28 has been described for providing movement in one direction. A second set, 56 and 58 is also provided for movement in the other direction. Inasmuch as nozzles 58 and 28 are on the approximate same line (6 o'clock) they must be staggered with respect to each other.

In FIG. 9, a method of transferring rolls 34 from one air conveyor to another is illustrated. Two conveyors 20 are shown in abutting side-by-side relationship with a transfer area 60 provided by removing adjacent side portions from each conveyor to provide a smooth transition from one to the other. A pair of jets 62 are provided in the wall of the feeder conveyor opposite the transfer area whereby the air issuing therefrom kicks the roll into the adjacent conveyor through the transfer area.

FIG. 10 illustrates a pressure loading, or force feeding, of a wrapper utilizing a sailstrip air conveyor. As rolls 34 are driven along conveyor 20 towards wrapper 64, they encounter a downwardly sloping pressure section 66 which utilizes the weight of the rolls to force feed them into the wrapper. The force which is exerted by the rolls themselves may be augmented or diminished by varying the air loading in the section 66 and having that section reversable in accordance with the section shown in FIGS. 7 and 8.

FIG. 11 shows a variation on the storage and sorting systems of FIGS. 4, 5 and 6. In this particular embodiment a plurality of longitudinally extending air conveyors 68 are circumferentially spaced at the end of spokes 70 for rotation about a hub 72. Hub 72 also carries the main air pressure and incorporates valving for feeding the air through a pipe 71 in the appropriate spoke 72 to the appropriate conveyor 68 for movement of rolls 34. A feed conveyor 74, is provided in a position for alignment with any desired conveyor 68 as it rotates into an end aligned position for transfer of the rolls into the storage system. It should be noted that the conveyors 68 are gimballed between the spokes 70 so that their support surfaces are always maintained horizontal. The air from each spoke 70 is thus fed into the end of the conveyor's plenum chamber while charging or discharging, as required.

The sailstrip air conveyor concept is not limited to the size of rolls which may be handled. Although the preceeding examples have dealt with tissue rolls, larger rolls could be handled in the same manner. The following examples illustrate applications of the sailstrip air conveyor principle within the paper mill whereby large rolls of paper are handled with ease.

FIG. 12 illustrates a basic in-plant installation for handling large rolls, such as rolls of newsprint 75. In this instance, the air conveyor 76 is mounted permanently in the floor and provides for reversable movement of the roll 75. No guides are required for the rolls and each roll can be easily pushed from the conveyor, with or without the use of supplementary kicking jets as shown in FIG. 9. Inasmuch as newsprint rolls are of a very large diameter, the depression created in the floor by the air conveyor is of a shallow depth and will not hinder the passage of lift trucks and the like across the floor.

A further step in transporting items through a mill is shown in FIG. 13 whereby an air conveyor 76 in the floor provides support and propulsion for a load carrying tray 78 having a curved lower surface 80. Such a load handling device would find uses in warehouses, assembly lines and any other areas where large loads need to be transferred over long distances indoors and outdoors. It is also understood that a conveyor configuration could be utilized wherein the object to be conveyed has a concave outer surface and rides on a convex support or rail in a manner analagous to that already described. It would then be necessary, of course, to guide the object on the conveyor rail to prevent it falling away therefrom.

FIG. 14 shows the sailstrip air conveyor concept applied to conveyor rolls whereby pressure chamber 82 supplies the pressure fluid to concave supports 84 to provide rotation and support to conveyor rolls 86. These free floating rollers would then provide support and motion to a load such as that shown at 88. FIG. 15 shows in perspective, the open end of a typical pressure chamber whereby end restraint jets 90 center the rolls 86.

This type of conveyor system has advantages over known systems as it is non-lubricated and is self-dusting, the air movement preventing any build-up on or around the rolls 86 and if used outside it would prevent the formation of ice, especially if the air under pressure were warmed. In foundries or steel mills, the air would help cool the rolls and thereby prevent distortion and other detrimental effects due to conveying extremely hot material. The conveyor system could even be utilized underwater by using water as the pressure fluid instead of air.

In tunnel or covered conveyor systems such as shown in FIG. 16, the air conveyor of the present invention has an additional advantage in assisting ventilation and circulation. As can be seen in that drawing, a covered inlet conveyor 92 feeds rolls into any one of a plurality of stacked conveyor sections 94. The conveyor sections 94 are stacked so as to achieve maximum density with the inlet conveyor being selectively alignable with the conveyors 94. The covered structures provide exhaust air chambers 98 above the conveyor portion, in which chambers the rolls 34 may move. Exhaust air in the chambers may exhaust through ports 96 and also into exhaust plenum 100 to thereby maintain chambers 98 free from dust accumulation or contamination. It is noted that the pressurized air for the conveyor portions is not permitted to enter the exhaust plenum 100; only the chambers 98 communicate therewith. A covered output conveyor 102 is adapted to receive rolls from any one of the stacked conveyor sections 94 for transport to other areas of the mill.

I claim:

1. A conveyor for conveying objects having a curved outer surface comprising curved support means for receiving said object, fluid plenum means adjacent said support means and a plurality of spaced fluid directing nozzles communicating between said plenum means and a surface portion of said support means, said nozzles being asymmetrically disposed substantially on one side of the longitudinal axis, obliquely disposed with respect to a tangent at said surface portion of said support means and obliquely disposed forwardly with respect to the longitudinal axis, said obliquities being substantially in the range of 25° to 60°, whereby fluid under pressure in said plenum means is directed by said nozzles to said surface portion to create a support fluid film wedge between said surface portion and said curved outer surface to displace said object away from said support means and to impart longitudinal movement therealong.

2. A conveyor for conveying objects having a convex outer surface comprising concave support means for receiving said object, fluid plenum means adjacent said support means and a plurality of spaced fluid directing nozzles communicating between said plenum means and an inner surface portion of said support means, said nozzles being asymmetrically disposed substantially on one side of the longitudinal axis, obliquely disposed with respect to a tangent at said inner surface portion of said support means and obliquely disposed forwardly with respect to the longitudinal axis, said obliquities being substantially in the range of 25° to 60°, whereby fluid under pressure in said plenum means is directed by said nozzles to said inner surface portion to create a support fluid film wedge between said inner surface portion and said convex outer surface to displace said object away from said support means and to impart longitudinal movement therealong.

3. A conveyor according to claim 2 wherein said fluid plenum means is adjacent an outer surface portion of said support means and said nozzles extend through said support means from said plenum means to said inner surface portion.

4. A conveyor according to claim 3 wherein said nozzles are positioned in adjacent longitudinally directed lines, one of which coincides approximately with the centerline of said inner surface portion, the nozzles of said one line being staggered with respect to the nozzles of the other line.

5. A conveyor according to claim 3 wherein said inner surface portion has a radius of curvature greater than that of the convex outer surface.

6. A conveyor according to claim 4 wherein said support means and said plenum means are flexible to facilitate changes in elevation and direction of desired movement.

7. A conveyor according to claim 4 wherein said nozzles impart a spiral motion to said object.

8. A conveyor according to claim 4 wherein said plenum means includes separator means thereby providing a pair of plenum chambers therein, each plenum chamber having a plurality of nozzles associated therewith whereby the nozzles of one of said plenum chambers will impart movement to said object in one direction and the nozzles of the other plenum chamber will impart movement in the opposite direction.

9. A conveyor according to claim 8 wherein the nozzles lying along said approximate centerline are alternately associated with one or the other of said plenum chambers, each of said nozzles being directed in the desired direction of travel.

10. A conveyor for conveying objects having a convex outer surface comprising a pair of concave support means in side-by-side abutting relationship to each other for receiving said object, each said support means including inner and outer surface portions, fluid plenum means adjacent said outer surface portion and a plurality of spaced fluid directing nozzles extending through said support means from said plenum means to said inner surface portion, said nozzles being positioned in adjacent longitudinally directed lines, one of which coincides approximately with the centerline of said inner surface portion and is obliquely disposed with respect to a tangent at said inner surface portion whereby fluid under pressure in said plenum means is directed by said nozzles to said inner surface portion to create a support fluid film wedge between said inner surface portion and said convex outer surface to displace said object away from said support means; a transfer area providing a smooth transition from one support means to the other and kicker nozzle means in one of said support means opposite said transfer area for imparting movement to said object through said transfer area to said other support means.

11. A conveyor system for accumulating a plurality of objects having a convex outer surface comprising an input conveyor, an output conveyor and a plurality of adjacent, interconnected accumulation conveyors, said input conveyor being adapted to feed said objects into said accumulation conveyors, said output conveyor being adapted to receive said objects from said accumulation conveyors, each of said input, output and accumulation conveyors comprising concave support means, fluid plenum means adjacent said support means and a plurality of spaced fluid directing nozzles asymmetrically disposed substantially on one side of the longitudinal axis of the support means and communicating between said plenum means and an inner surface portion of said support means for directing fluid under pressure to said inner surface portion at an angle oblique to a tangent at said inner surface and at an angle forwardly oblique to said longitudinal axis, said oblique angles being substantially in the range of 25° to 60°, to support said object upon a wedge of said fluid and to impart longitudinal movement to said object.

12. A conveyor system according to claim 11 wherein said accumulation conveyors are circumferentially spaced about and parallel to a central axis parallel to said input and output conveyors, each of said accumulation conveyors being selectively alignable with said input or output conveyor.

13. A conveyor system according to claim 12 and including hub means on said axis, spoke means between each of said accumulation conveyors and said hub means, gimbal means connecting each spoke to its associated accumulation conveyor and valving means in said hub for selectively providing fluid under pressure through said spoke means to an accumulation conveyor aligned with said input or output conveyor.

14. A conveyor system according to claim 11 wherein said input, output and accumulation conveyors are longitudinally enclosed in a pipe to protect the conveying surface and supported objects, said pipe being provided with a plurality of exhaust ports for removal of fluid from the confines of said pipe.

15. In a system for supporting a first body above a second body wherein one of said bodies has a generally concave surface and the other has a generally convex surface, means asymmetrically positioned substantially on one side of the centerline of said concave surface for projecting fluid from said concave surface at an angle oblique with respect to a tangent at said concave surface and forwardly oblique with respect to said centerline, said obliquities being substantially in the range of 25° to 60° to form a wedge of fluid thickness diminishing in the direction of projection between said surfaces to support said first body above said second body and to impart longitudinal movement therealong.

16. A system according to claim 15 wherein said one body is provided with plenum means and said projecting means comprises a plurality of spaced nozzles communicating between said plenum and said concave surface.

17. A system according to claim 16 wherein at least said one body is elongate and has a longitudinal axis, the angle of said nozzles being oblique with respect to said axis and with the tangent at said concave surface whereby said fluid will impart relative longitudinal movement between said supported first body and said second body.

18. A system according to claim 16 wherein said concave surface has a degree of curvature at least as great as that of said convex surface.

* * * * *